(12) United States Patent
You et al.

(10) Patent No.: US 11,327,488 B2
(45) Date of Patent: May 10, 2022

(54) NON-UNIFORM LIGHT-EMITTING LIDAR APPARATUS AND AUTONOMOUS ROBOT INCLUDING THE SAME

(71) Applicant: SAMSUNG ELECTRONICS CO., LTD., Suwon-si (KR)

(72) Inventors: Jangwoo You, Seoul (KR); Namseop Kwon, Suwon-si (KR); Yonghwa Park, Yongin-si (KR); Jisan Lee, Suwon-si (KR); Myungjae Jeon, Yongin-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 1261 days.

(21) Appl. No.: 15/644,173

(22) Filed: Jul. 7, 2017

(65) Prior Publication Data
US 2018/0011490 A1    Jan. 11, 2018

(30) Foreign Application Priority Data
Jul. 7, 2016 (KR) .......................... 10-2016-0086400

(51) Int. Cl.
| | | |
|---|---|---|
| G05D 1/00 | (2006.01) | |
| G01S 17/89 | (2020.01) | |
| G01S 17/04 | (2020.01) | |
| G01S 17/931 | (2020.01) | |
| G01S 7/481 | (2006.01) | |
| G05D 1/02 | (2020.01) | |

(52) U.S. Cl.
CPC .......... *G05D 1/0088* (2013.01); *G01S 7/4814* (2013.01); *G01S 17/04* (2020.01); *G01S 17/89* (2013.01); *G01S 17/931* (2020.01); *G05D 1/0231* (2013.01); *Y10S 901/47* (2013.01)

(58) Field of Classification Search
CPC ... G02B 5/02; B60W 10/00; B60W 60/00276; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00
See application file for complete search history.

(56) References Cited

U.S. PATENT DOCUMENTS 4,149,773 A * 4/1979 Reid ...................... G02B 27/09
359/641
5,880,861 A * 3/1999 Nishida ................ G02B 5/0236
359/15
(Continued)

FOREIGN PATENT DOCUMENTS

| JP | 2015-125317 A | 7/2015 |
|---|---|---|
| KR | 10-0735565 B1 | 7/2007 |

(Continued)

*Primary Examiner* — Yuqing Xiao
*Assistant Examiner* — Amir J Askarian
(74) *Attorney, Agent, or Firm* — Sughrue Mion, PLLC

(57) ABSTRACT

Provided are non-uniform light-emitting lidar (light detection and ranging) apparatuses and autonomous robots including the same. A lidar apparatus may include a light source configured to emit light, an optical unit arranged on an optical path of light emitted from the light source and configured to change an optical profile of the light to be non-uniform, and a 3D sensor configured to sense location of an object by receiving reflection light from the object.

9 Claims, 15 Drawing Sheets

(56) References Cited

U.S. PATENT DOCUMENTS

| | | | | |
|---|---|---|---|---|
| 6,056,198 | A * | 5/2000 | Rudeen | G06K 7/10594 |
| | | | | 235/454 |
| 7,085,062 | B2 * | 8/2006 | Hauschild | G02B 27/0944 |
| | | | | 359/558 |
| 7,507,948 | B2 | 3/2009 | Park et al. | |
| 8,996,172 | B2 | 3/2015 | Shah et al. | |
| 2002/0052711 | A1 * | 5/2002 | Aoyama | G01S 7/4811 |
| | | | | 702/158 |
| 2003/0042303 | A1 * | 3/2003 | Tsikos | G06K 9/26 |
| | | | | 235/384 |
| 2011/0249273 | A1 * | 10/2011 | Kawazoe | G01S 17/88 |
| | | | | 356/614 |
| 2012/0147147 | A1 | 6/2012 | Park et al. | |
| 2013/0333472 | A1 * | 12/2013 | Georgeson | G01N 21/1702 |
| | | | | 73/584 |
| 2014/0319219 | A1 * | 10/2014 | Liu | G06K 7/10792 |
| | | | | 235/455 |
| 2015/0341619 | A1 * | 11/2015 | Meir | G01S 17/87 |
| | | | | 348/47 |
| 2016/0178736 | A1 * | 6/2016 | Chung | G01S 17/42 |
| | | | | 356/4.01 |
| 2019/0056498 | A1 * | 2/2019 | Sonn | G01S 17/931 |

FOREIGN PATENT DOCUMENTS

| | | |
|---|---|---|
| KR | 10-2012-0066499 A | 6/2012 |
| KR | 10-2014-0067669 A | 6/2014 |
| KR | 20140067669 A * | 6/2014 |

\* cited by examiner

NON-UNIFORM LIGHT-EMITTING LIDAR APPARATUS AND AUTONOMOUS ROBOT INCLUDING THE SAME

CROSS-REFERENCE TO RELATED APPLICATION

This application claims priority from Korean Patent Application No. 10-2016-0086400, filed on Jul. 7, 2016, in the Korean Intellectual Property Office, the disclosure of which is incorporated herein in its entirety by reference.

BACKGROUND

1. Field

Apparatuses and methods consistent with exemplary embodiments relate to non-uniform light-emitting lidar (light detection and ranging) apparatuses and autonomous robots including the same.

2. Description of the Related Art

An autonomous robot denotes a robot that is able to autonomously move without supplying an external signal and power because a power source and a sensor are mounted within the robot. The autonomous robot embeds map information of a certain space. In order to freely move in the certain space, the autonomous robot detects its current location, sets a moving path to a destination, and moves to the destination set in advance by using a sensor to avoid obstacles.

The autonomous robot has been mainly developed as a cleaning robot for cleaning an interior of rooms and a security robot for guarding a house from an intruder.

An autonomous robot of the related art includes at least two sensors, such as a front obstacle sensor, an upper side obstacle sensor, a sidewall sensor, and a roof camera for simultaneous localization and mapping (SLAM). Although the autonomous robot includes these sensors, regions to detect near-by obstacles are limited, and thus, problems of pushing the obstacles have occurred. Also, the autonomous robot requires a lot of time and costs for assembling and calibrating the various types of sensors.

SUMMARY

One or more exemplary embodiments may provide non-uniform light-emitting lidar apparatuses configured to increase photographing efficiency by irradiating non-uniform light.

One or more exemplary embodiments may provide autonomous robots including the non-uniform light-emitting lidar apparatus configured to increase photographing efficiency by irradiating non-uniform light.

Additional exemplary aspects will be set forth in part in the description which follows and, in part, will be apparent from the description, or may be learned by practice of the exemplary embodiments.

According to an aspect of an exemplary embodiment, there is provided a lidar apparatus including: a light source configured to emit light; an optical unit arranged on an optical path of light emitted from the light source and configured to change an optical profile of the light to be non-uniform; and a 3D sensor configured to sense a location of an object by receiving reflection light from the object.

The optical unit may include a diffuser configured to be arranged on the optical path of light emitted from the light source and to diffuse light; and an optical element arranged on the optical path of diffusing light diffused from the diffuser and configured to change an optical profile of the diffusing light to be non-uniform when the diffusing light is emitted.

The optical element may change the optical profile of the diffusing light so that intensities of light reaching an object from the lidar apparatus are different according to distances.

The optical element may tilt a portion of the diffusing light that proceeds towards a bottom surface by diffusing from the diffuser so that the portion of the diffusing light proceeds towards an object located remotely from the optical element.

The optical element may change an optical profile of the diffusing light to prevent the 3D sensor from over saturating by reflection light reflected by an object located near the optical element.

The optical element may include at least one of a cylinder lens, a micro lens array, a Fresnel lens, and a grating device.

The cylinder lens may include a biconvex lens.

The optical element may be arranged to contact the diffuser.

The light source may be arranged on an upper side of the 3D sensor based on a ground surface.

The light source may be arranged on a lower side of the 3D sensor based on a ground surface.

The light source and the 3D sensor may be horizontally arranged based on a ground surface.

The light source may include a laser diode or a laser.

According to an aspect of another exemplary embodiment, there is provided an autonomous robot including: a lidar apparatus that includes: a light source configured to emit light; a diffuser arranged on an optical path of light emitted from the light source and configured to diffuse light; an optical element arranged on an optical path of diffusing light diffused from the diffuser and configured to change an optical profile of the diffusing light to be non-uniform when the diffusing light is emitted; and a 3D sensor configured to sense a location of an object by receiving reflection light from the object; and a robot main body configured to mount the lidar apparatus and to control driving direction in response to location information sensed by the lidar apparatus.

The optical element may change the optical profile of the diffusing light so that intensities of light reaching an object located near the optical element and an object located remotely from the optical element are different.

The optical element may change an optical profile of the diffusing light to prevent the 3D sensor from over saturating by reflection light reflected by an object located near the optical element.

The optical element may include at least one of a cylinder lens, a micro lens array, a Fresnel lens, and a grating device.

The cylinder lens may include a biconvex lens.

The radius of curvature of a lens surface of the cylinder lens in a diffuser direction may be greater than that of a lens surface in a direction opposite to the diffuser direction.

The light source is arranged on an upper side of the 3D sensor based on a ground surface.

The light source may be arranged on a lower side of the 3D sensor based on a ground surface.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
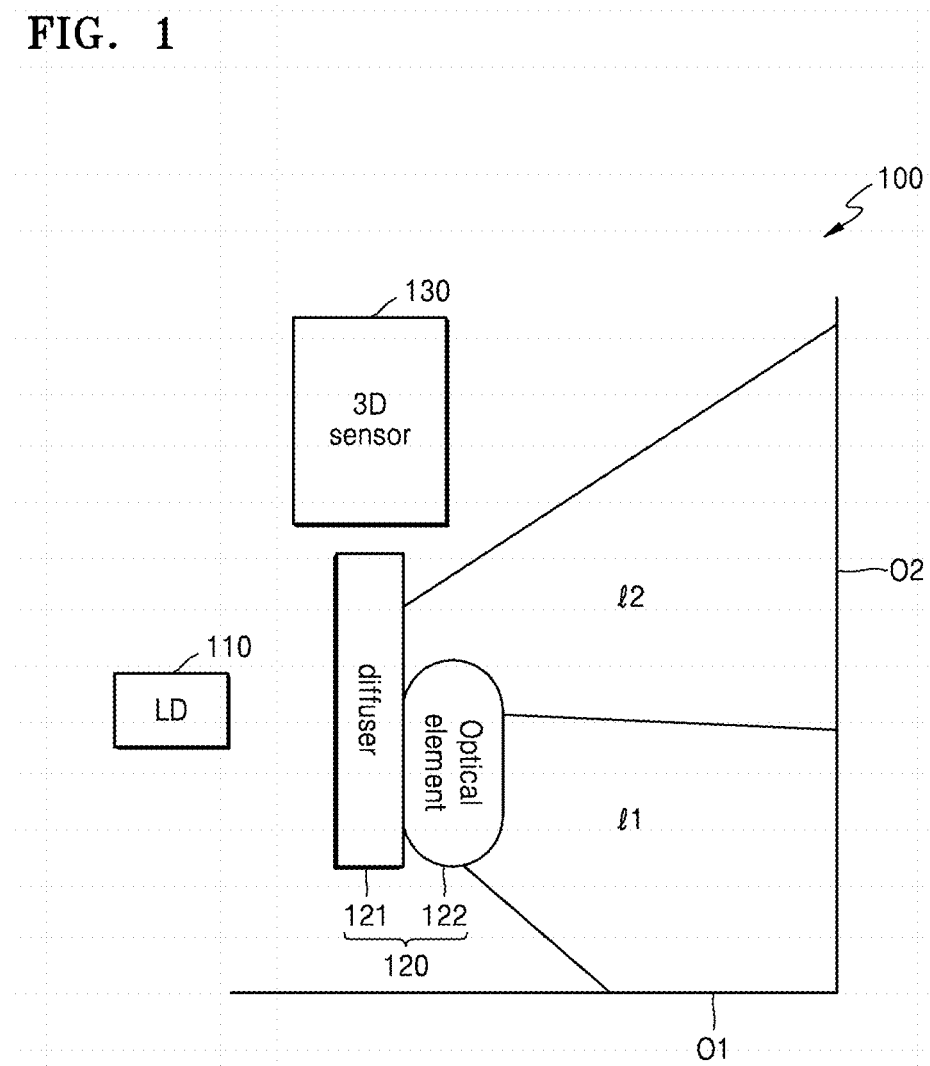
FIG. 1 is a schematic drawing of a non-uniform light-emitting lidar apparatus according to an exemplary embodiment.

Hereinafter, non-uniform light-emitting lidar apparatuses and autonomous robots including the non-uniform light-emitting lidar apparatus will be described in detail with reference to the accompanying drawings.

In the drawings, like reference numerals refer to like elements throughout and sizes of constituent elements may be exaggerated for clarity and convenience of explanation. It will be understood that although the terms "first", "second", etc. may be used herein to describe various components, these components should not be limited by these terms. These components are only used to distinguish one component from another.

The terminology used herein is for the purpose of describing particular embodiments only and is not intended to be limiting of exemplary embodiments. As used herein, the singular forms may include the plural forms as well, unless the context clearly indicates otherwise. It should be further understood that, when a part "comprises" or "includes" an element in the specification, unless otherwise defined, other elements are not excluded from the part and the part may further include other elements.

FIG. 1 is a schematic drawing of a non-uniform light-emitting lidar apparatus 100 according to an exemplary embodiment.

Referring to FIG. 1, the non-uniform light-emitting lidar apparatus 100 may include a light source 110, an optical unit 120, and a three dimensional (3D) sensor 130. The optical unit 120 may include a diffuser 121 and an optical element 122. The optical element 122 may be arranged at least on a surface of the diffuser 121 to change an optical profile of diffusing light emitted from the diffuser 121 to be non-uniform. Light emitted from the optical unit 120 may be reflected at objects O1 and O2. For example, the light emitted from the optical unit 120 may be reflected at a ground surface O1 and an obstacle O2. Lights reflected at the ground surface O1 and the obstacle O2 may be received by the 3D sensor 130, and thus, the locations of the ground surface O1 and the obstacle O2 may be sensed.

The non-uniform light-emitting lidar apparatus 100 may have a function of measuring distances to the ground surface O1 and the obstacle O2. For example, the non-uniform light-emitting lidar apparatus 100 may use a time-of-flight (TOF) method. In the TOF method, flight times of first and second lights I1 and I2 irradiated toward the objects O1 and O2, reflected from the objects O1 and O2, and received at the 3D sensor 130 may be measured. For example, the measurement of flight time is performed through a phase delay, and, in this case, the 3D sensor 130 may include a transmission-type shutter (not shown) that may be modulated at a high speed. The transmission-type shutter (not shown) may be an electro-optical device of which the transmittance is changed according to a reverse bias voltage.

The non-uniform light-emitting lidar apparatus 100 according to the exemplary embodiment may be used in an autonomous robot, and may simultaneously sense the ground surface O1 and the obstacle O2 for an autonomous movement. Although the obstacle O2 is a sidewall in FIG. 1, but is not limited thereto, and the obstacle O2 may be various types of obstacles O2. Also, the ground surface O1 is depicted as a plane, but is not limited thereto, and the ground surface O1 may have various types of surface states, slopes, and shapes. Also, it is depicted that the ground surface O1 is relatively closer to the non-uniform light-emitting lidar apparatus 100 than the obstacle O2, but is not limited thereto. The ground surface O1 may not necessarily denote a flat lower surface in a room, but may denote a hard lower surface that cannot transmit diffusing light in various environments, for example, hills, roads, or buildings, etc.

The non-uniform light-emitting lidar apparatus 100 according to the exemplary embodiment may perform a simultaneous localization and mapping (SLAM) function by using the single 3D sensor 130 and the single light source 110. Accordingly, because only the single non-uniform light-emitting lidar apparatus 100 may be mounted on an autonomous robot, the assembly of the autonomous robot is easy, and thus, costs may be reduced.

The light source 110 may be a light source apparatus that irradiates light. For example, the light source 110 may irradiate light of an infrared ray region. Because the light source 110 irradiates light of the infrared ray region, the non-uniform light-emitting lidar apparatus 100 may sense objects in the presence of daylight by preventing mixing of infrared ray with visible ray. When the light source 110 irradiates light of the infrared ray region, the non-uniform light-emitting lidar apparatus 100 may sense objects by infrared ray reflected from objects and by blocking visible ray with an optical filter. However, light emitted from the light source 110 is not limited thereto, and the light source 110 may emit light of various wavelength regions. For example, the light source 110 may be a laser light source. For example, the light source 110 may be one of an edge emitting laser, a vertical-cavity surface emitting laser (VCSEL), and a distributed feedback laser. For example, the light source 110 may be a laser diode (LD).

The diffuser 121 may be arranged on an optical path of light that is emitted from the light source 110. The diffuser 121 may make light have a uniform optical profile by diffusing the light emitted from the light source 110. The uniform optical profile may refer to a uniform intensity of light when the light is diffused from the diffuser 121, but may not refer to a uniform intensity of light when the light reaches the objects O1 and O2. Because light is three dimensionally diffused in a space, the intensities of light irradiated to the objects O1 and O2 may vary according to various variables, such as distances from the light source 110 to the objects O1 and O2 and the intensity of emitted light. Accordingly, when light with a uniform optical profile is emitted from the diffuser 121, a large amount of light may be irradiated onto the objects O1 and O2 located relatively near to the light source 110, and a small amount of light may be irradiated onto the objects O1 and O2 located relatively remote from the light source 110.

Because the diffusing light is uniformly spread by the combination of the light source 110 and the diffuser 121, a large amount of light may be irradiated onto the ground surface O1 located relatively near to the light source 110, and a small amount of light may be irradiated onto the obstacle O2 located relatively remote from the light source 110. In this case, an excessive amount of light for sensing the ground surface O1 may be irradiated onto the ground surface O1, and accordingly, a portion of the ground surface O1 sensed by the non-uniform light-emitting lidar apparatus 100 may be saturated, and thus, become white (refer to FIG. 4). Further, an amount of light for sensing the obstacle O2 located relatively remote from the light source 110 may be insufficient. Thus, a portion of the obstacle O2 may be dark, and thus, an SLAM function may not be smoothly realized (refer to FIG. 4).

The optical element 122 may be arranged on an optical path of light that is diffused from the diffuser 121. The optical element 122 may change an optical profile of the diffusing light to be non-uniform. The non-uniform optical profile may denote the non-uniform intensity of light emitted from the diffuser 121, but may not denote the non-uniform intensity of light irradiated onto the objects O1 and O2. For example, because the optical profile of light emitted from the optical element 122 is non-uniform, light of substantially the same intensity may reach the ground surface O1 located relatively near to the light source 110 and the obstacle O2 located relatively remote from the light source 110. That is, the intensity of reflection light may be reduced due to distances to the objects O1 and O2, and thus, the introduction of the optical element 122 may appropriately compensate for the intensity reduction of diffusing light by changing the optical profile of the diffusing light to be non-uniform.

Referring to FIG. 1, the optical element 122 is arranged on a surface of the diffuser 121, and thus, may change an optical path of some of the diffusing light. For example, the optical element 122 may irradiate the first light I1 to the objects O1 and O2 by changing the optical path of the diffusing light from the diffuser 121. For example, the optical element 122 may irradiate light onto the obstacle O2 by changing an optical path of some of the light proceeding towards the ground surface O1. For example, an uncovered part of the diffuser 121 by the optical element 122 may irradiate the second light I2 onto the obstacle O2.

The optical element 122 may change an optical profile so that the intensities of radiation reaching the objects O1 and O2 vary according to distances to the objects O1 and O2. For example, the optical element 122 may change the optical path by tilting some of the diffusing light proceeding towards the ground surface O1 to proceed towards an object located relatively remote from the non-uniform light-emitting lidar apparatus 100. For example, the optical element 122 may change an optical profile of the diffusing light to avoid the saturation of the 3D sensor 130 by light reflected from the ground surface O1. Also, for example, the optical element 122 may allow sensing the ground surface O1 and the obstacle O2 with wide angle by changing an optical profile of the diffusing light.

The optical element 122 may include at least one of a cylinder lens, a micro-lens array, a Fresnel lens, and a grating lens. The optical element 122 is not limited thereto, and may include various types of optical devices that change an optical profile or an optical path.

The optical element 122 may be arranged to contact the diffuser 121. However, the arrangement of the optical element 122 is not limited thereto, and various arrangements may be designed according to simulations and tests.

The 3D sensor 130 may sense locations of the objects O1 and O2 by sensing reflection light from the objects O1 and O2. The 3D sensor 130 may be a well-known constituent element, and thus, is not specifically limited. For example, the 3D sensor 130 may include a transmission-type shutter (not shown) of which the transmittance is changed according to a reverse bias voltage, an image sensor (not shown), such as a Complementary metal-oxide-semiconductor (CMOS) and Charge-coupled device (CCD), and an optical unit (not shown), such as a convex lens. The 3D sensor 130 may be a well-known constituent element, and thus, a detailed description thereof will be omitted.

The light source 110 and the 3D sensor 130 may be vertically or horizontally arranged based on the ground surface O1. For example, the light source 110 may be arranged above the 3D sensor 130. Alternatively, the light source 110 may be arranged below the 3D sensor 130.

Figure 2:
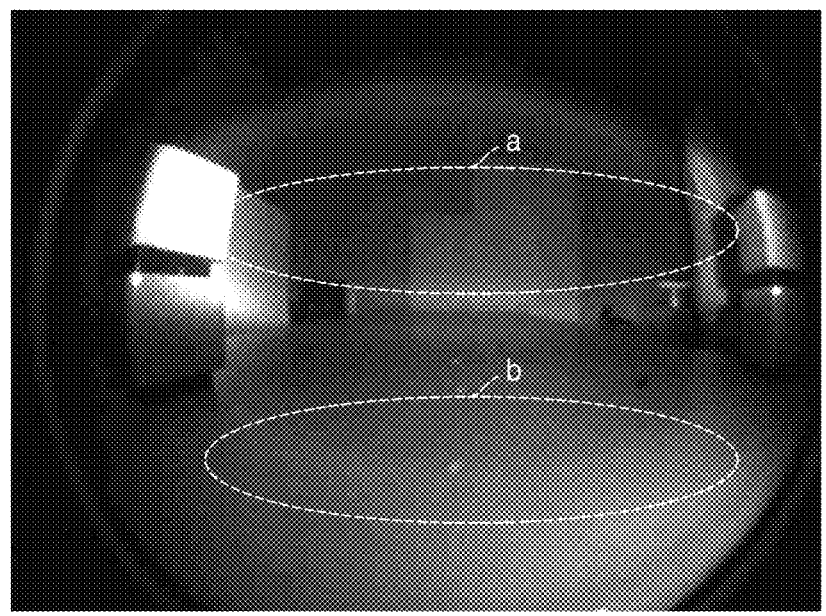
FIG. 2 is a photo-image taken by using the non-uniform light-emitting lidar apparatus of FIG. 1.

FIG. 2 is a photo-image taken by using the non-uniform light-emitting lidar apparatus 100 of FIG. 1. Referring to FIG. 2, it is confirmed that both a bottom surface (b) located relatively near to the light source 110 and a wall surface (a) located relatively remote from the light source 110 are uniformly recognized. The non-uniformity of the optical profile of diffusing light due to the optical element 122 may reduce the intensity of reflection light of first light I1 (refer to FIG. 1) received by the 3D sensor 130 to a level to be unsaturated and may increase the intensity of reflection light of second light I2 (refer to FIG. 1) to a level to the wall surface (a) is distinguished.

Figure 3:
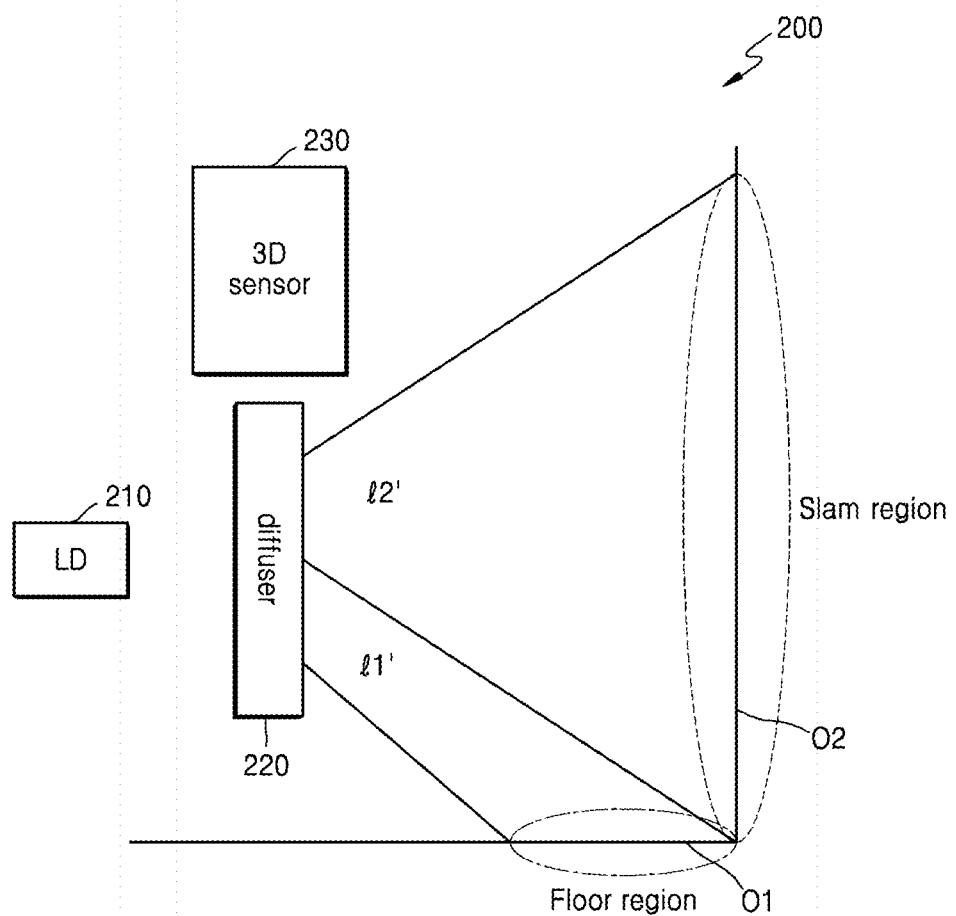
FIG. 3 is a schematic drawing of a lidar apparatus according to a comparative example.
Figure 4:
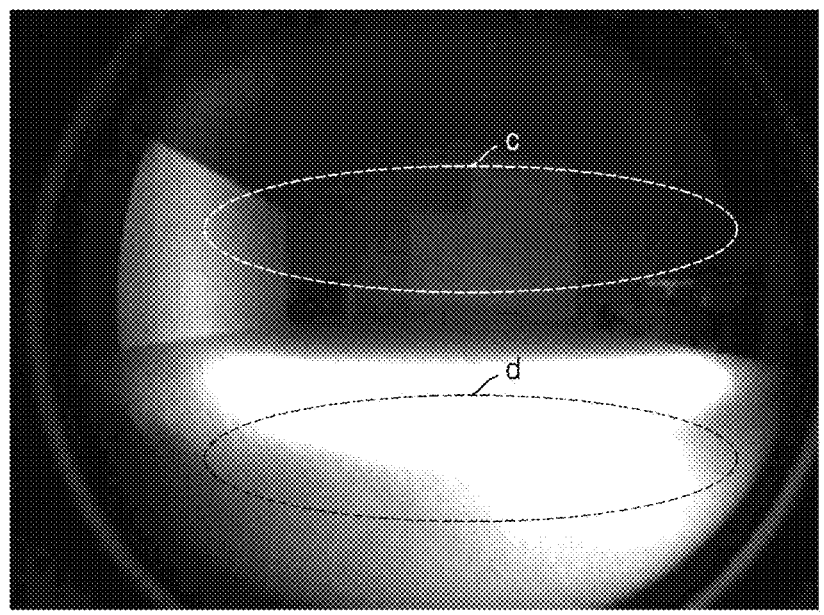
FIG. 4 is a photo-image taken by using the lidar apparatus of FIG. 3.

FIG. 3 is a schematic drawing of a lidar apparatus 200 according to a comparative example. FIG. 4 is a photo-image taken by using the lidar apparatus 200 of FIG. 3.

Referring to FIG. 3, the lidar apparatus 200 according to the comparative example may include a light source 210, a diffuser 220, and a 3D sensor 230. When the lidar apparatus 200 is compared to the non-uniform light-emitting lidar apparatus 100 of FIG. 1, the lidar apparatus 200 does not include the optical element 122 of FIG. 1, and remaining constituent elements are substantially equal to the constituent elements of the non-uniform light-emitting lidar apparatus 100.

Light emitted from the light source 210 is diffused by the diffuser 220. Lights I1' and I2' diffused by the diffuser 220 may be emitted with a uniform optical profile and are diffused to the ground surface O1 and the obstacle O2. Because the lidar apparatus 200 does not include the optical element 122 (refer to FIG. 1), the diffused lights I1' an I2' are diffused with a uniform optical profile in all directions, and thus, a large amount of light may be irradiated onto the ground surface O1 located relatively near to the diffuser 220, and relatively a small amount of light may be irradiated onto the obstacle O2 located relatively remote from the diffuser 220. Accordingly, reflection light reflected at the ground surface O1 may be over saturated when the reflection light is sensed by the 3D sensor 230, and reflection light that is reflected at the wall surface for SLAM photographing may be under saturated when the reflection light is sensed by the 3D sensor 230.

Accordingly, when the non-uniform light-emitting lidar apparatus 100 of FIG. 1 is compared with the lidar apparatus 200 according to the comparative example, the introduction of the optical element 122 (refer to FIG. 1) may facilitate the sensing effect of the 3D sensor 130 by reducing the intensity of light to a level that the ground surface O1 is distinguished and by increasing the intensity of light to a level that the obstacle O2 is distinguished.

The photo-image of FIG. 4 is captured by the lidar apparatus 200 according to the comparative example under the same condition as the photo-image of FIG. 2 is captured. Referring to FIG. 4, on the photo-image, a wall surface (c) is darker and less clear than the wall surface (a) of FIG. 2 due to insufficient intensity of light, and a bottom surface (d) is excessively brighter than the bottom surface (b) of FIG. 2 due to excessive intensity of light, and thus, a shape of the bottom surface is hardly distinguished.

Figure 5A:
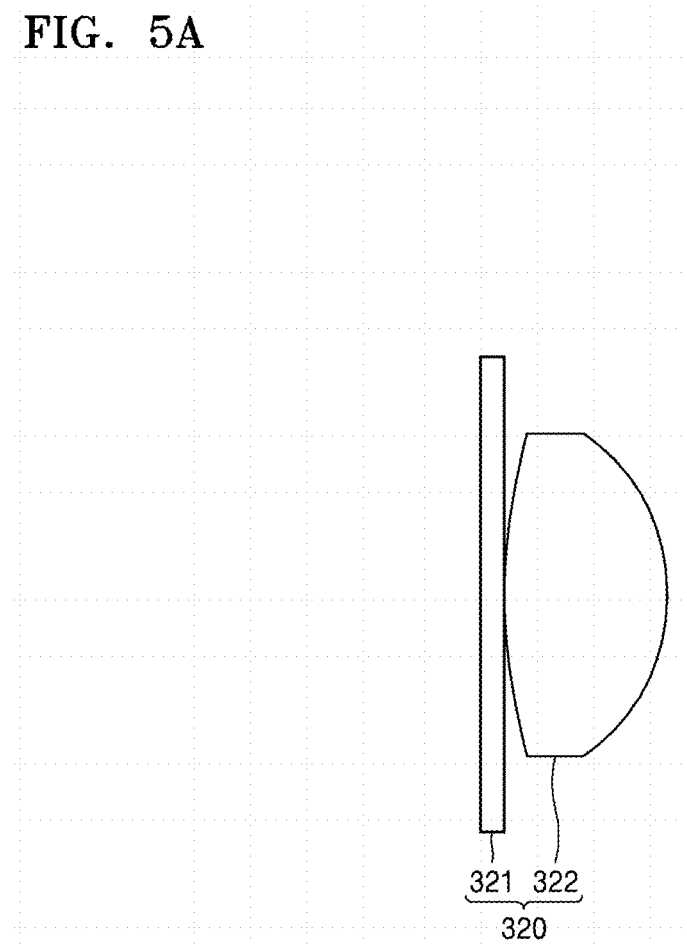
FIG. 5A is a schematic drawing of an optical unit according to an exemplary embodiment.
Figure 5B:
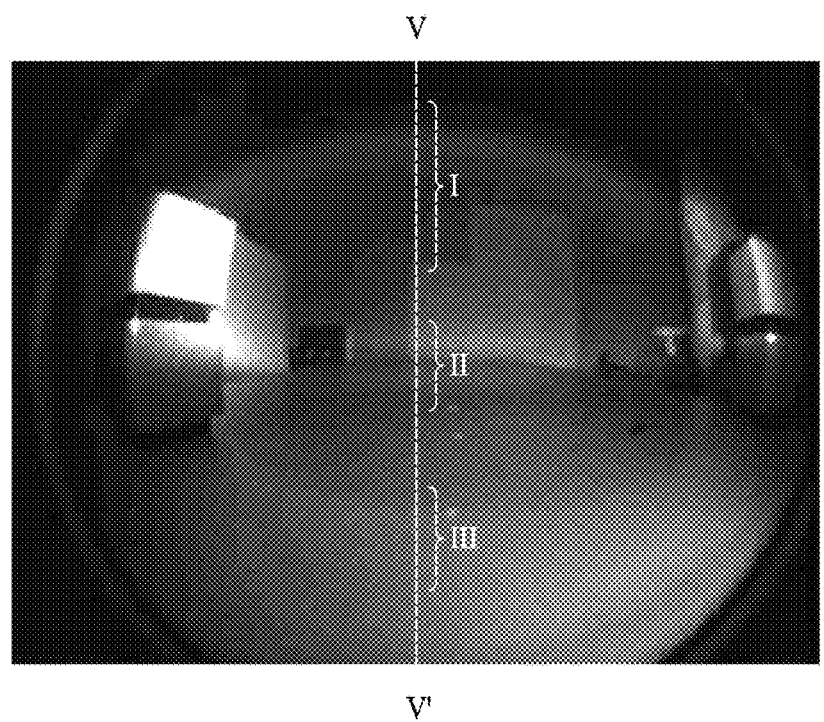
FIG. 5B is a photo-image taken by using a lidar apparatus including the optical unit of FIG. 5A.

FIG. 5A is a schematic drawing of an optical unit 320 according to an exemplary embodiment. FIG. 5B is a photo-image taken by using a lidar apparatus including the optical unit 320 of FIG. 5A.

Referring to FIG. 5A, the optical unit 320 according to the exemplary embodiment may include a diffuser 321 and a cylinder lens 322 that contacts the diffuser 321. For example, the cylinder lens 322 may be a biconvex lens. For example, a first lens surface of the cylinder lens 322 contacting the diffuser 321 may have a radius of curvature that is greater than that of a second lens surface opposite to the first lens surface of the cylinder lens 322. The cylinder lens 322 of FIG. 5A may have a radius of curvature as in Table 1.

TABLE 1

| | First lens surface in the diffuser | Second lens surface opposite to the first lens surface |
|---|---|---|
| Radius of curvature | 10 mm | 3.7 mm |

However, the cylinder lens 322 may have various shapes and radius of curvatures. An appropriate shape may be selected through simulations and tests, but is not limited thereto.

Referring to FIG. 5B, in a photo-image captured by a lidar apparatus on which the optical unit 320 according to the exemplary embodiment is mounted, it is confirmed that both a bottom surface located relatively near to the optical unit 320 and a wall surface located relatively remote from the optical unit 320 are uniformly distinguished.

Figure 6:
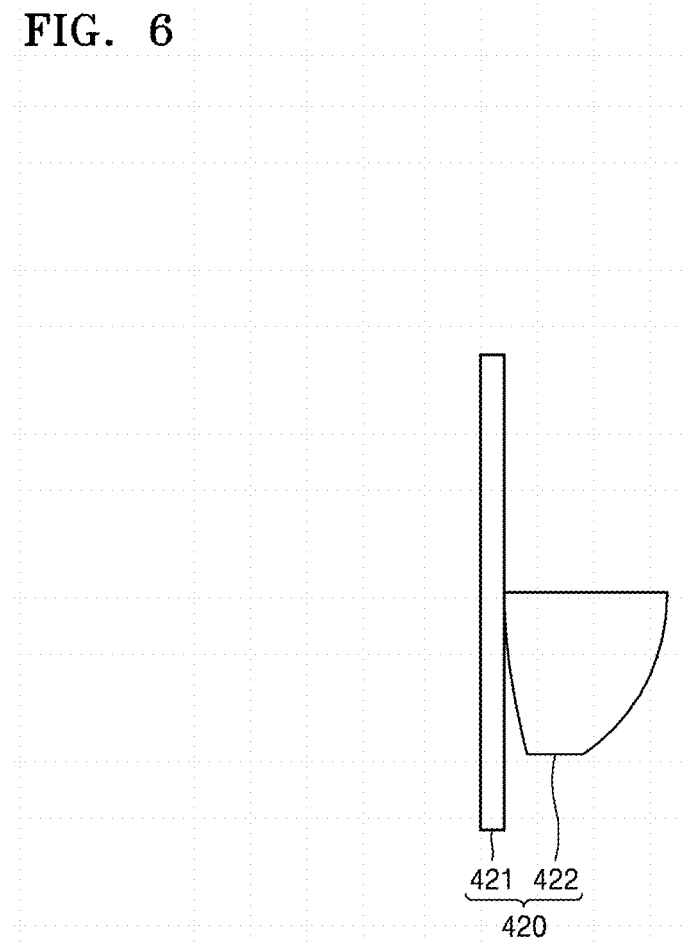
FIG. 6 is a schematic drawing of an optical unit according to another exemplary embodiment.

FIG. 6 is a schematic drawing of an optical unit 420 according to another exemplary embodiment. Referring to FIG. 6, the optical unit 420 may include a diffuser 421 and a cut cylinder lens 422 arranged to contact the diffuser 421.

The cut cylinder lens 422 may be a lens, a portion of which is cut. For example, the cut cylinder lens 422 may change an optical profile of diffusing light that is diffused on a surface of the diffuser 421 and is proceeding towards a lower side of the diffuser 421 and may not change an optical profile of the diffusing light that is diffused on a remaining surface of the diffuser 421.

Figure 7A:
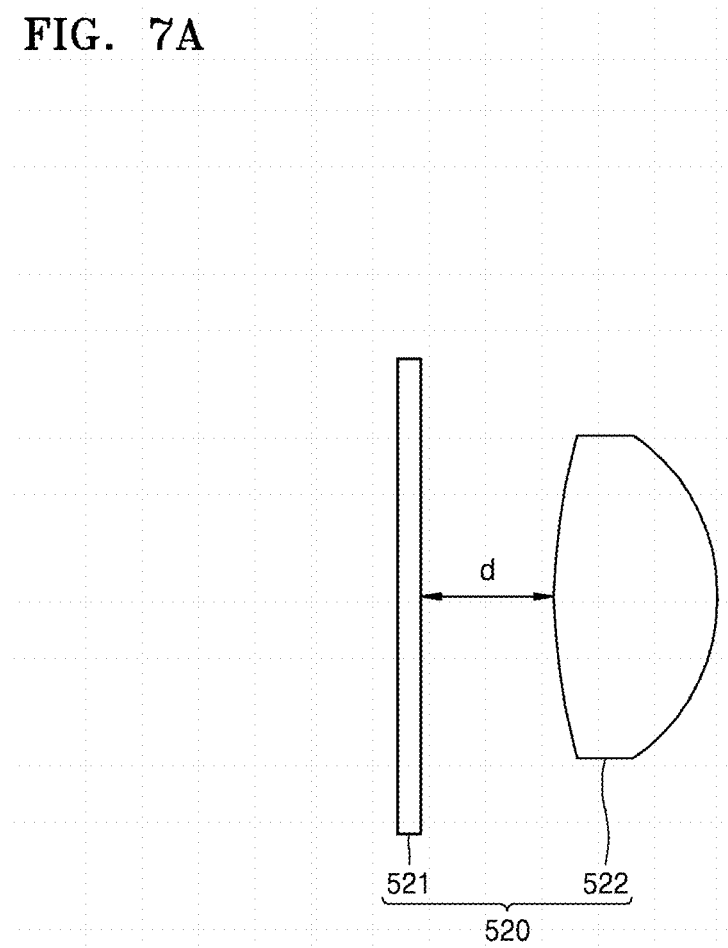
FIG. 7A is a schematic drawing of an optical unit according to another exemplary embodiment.
Figure 7B:
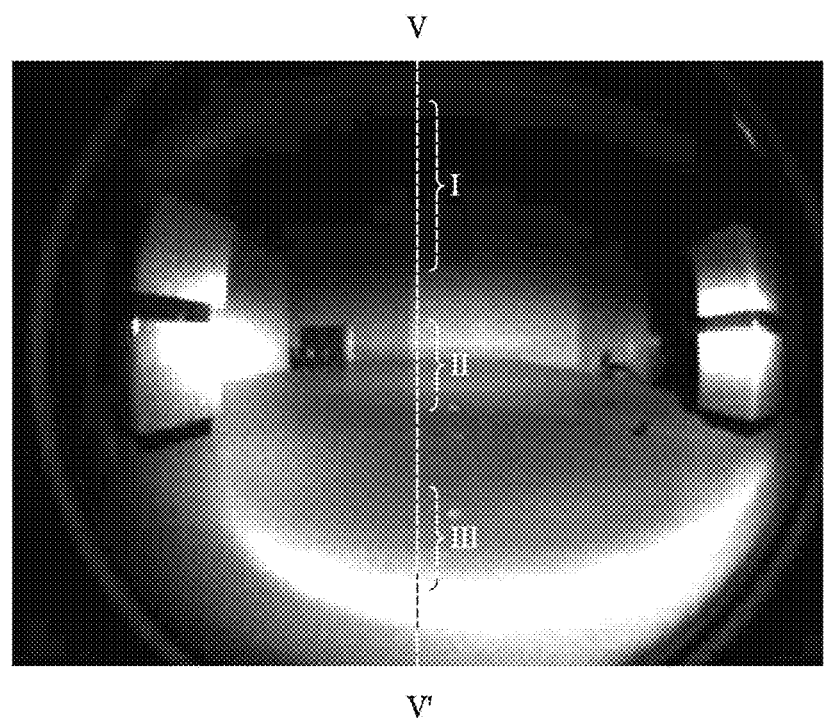
FIG. 7B is a photo-image taken by using a lidar apparatus including the optical unit of FIG. 7A.

FIG. 7A is a schematic drawing of an optical unit 520 according to another exemplary embodiment. FIG. 7B is a photo-image taken by using a lidar apparatus including the optical unit 520 of FIG. 7A.

Referring to FIG. 7A, the optical unit 520 may include a diffuser 521 and a cylinder lens 522 spaced a part by a predetermined distance d from the diffuser 521. The cylinder lens 522 may have various shapes and the distance d to the diffuser 521 may be variously selected.

Referring to FIG. 7B, in the photo-image captured by the optical unit 520 according to the exemplary embodiment, it is seen that a portion of a bottom surface located relatively near to the optical unit 520 is saturated. For example, a distance d from the diffuser 521 to the cylinder lens 522 in the optical unit 520 may be 4 mm. However, the distance according to the exemplary embodiment is not limited thereto.

The photo-images of FIGS. 5B and 7B are examples. Another result may be obtained according to a practical photographing condition and purpose. Those of ordinary skilled in the art may employ a desired optical unit through tests and simulations. In particular, different distances between a diffuser and an optical element may be selected.

Figure 8:
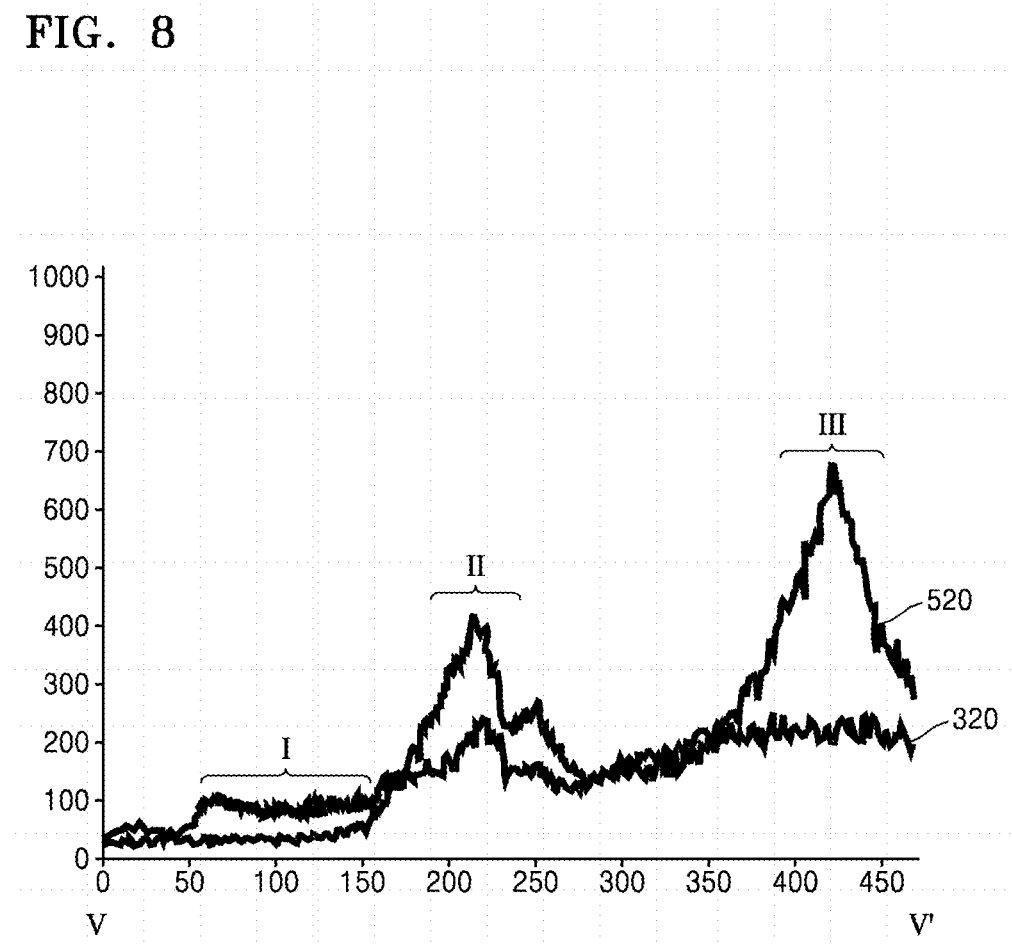
FIG. 8 is a graph of an optical profile of reflection light when an image is captured by using the lidar apparatuses of FIGS. 5A and 7A.

FIG. 8 is a graph of an optical profile of reflection light when an image is captured by using the lidar apparatuses of FIGS. 5A and 7A. Referring to FIG. 8, an x-axis indicates a relative location on a V-V' line in a vertical direction of a 3D sensor, and a y-axis indicates a relative intensity of reflection light received by the 3D sensor along the V-V' line.

Referring to FIGS. 5B, 7B, and 8, light reflected at an object (a wall surface) that is distantly located may be received in a region I of a 3D sensor, light reflected at a medium distance (a boundary between bottom surface and a wall surface) may be received by a region II of the 3D sensor, and light reflected at a short distance (a bottom surface) may be received by a region III of the 3D sensor.

Referring to FIG. 8, it is confirmed that a lidar apparatus including the optical unit 320 has a uniform optical profile on the region I, the region II, and the region III regardless of the distances. In a lidar apparatus including the optical unit 520, it is confirmed that a large intensity of reflection light is measured in the region I, and a low intensity of reflection light is measured in the region III. Accordingly, in the region I and the region III, the photographing efficiency of the lidar apparatus that employs the optical unit 320 is higher than that of the lidar apparatus that employs the optical unit 520. However, at the region II which is a boundary between the bottom surface and the wall surface, the photographing efficiency of the lidar apparatus that employs the optical unit 520 may be higher than that of the lidar apparatus that employs the optical unit 320. Accordingly, those of skill in the art may design the type and shape of an optical element to be mounted on the lidar apparatus and may differently design a distance between the optical element and the diffuser taking into account fields to be applied and photographing conditions.

Figure 9A:
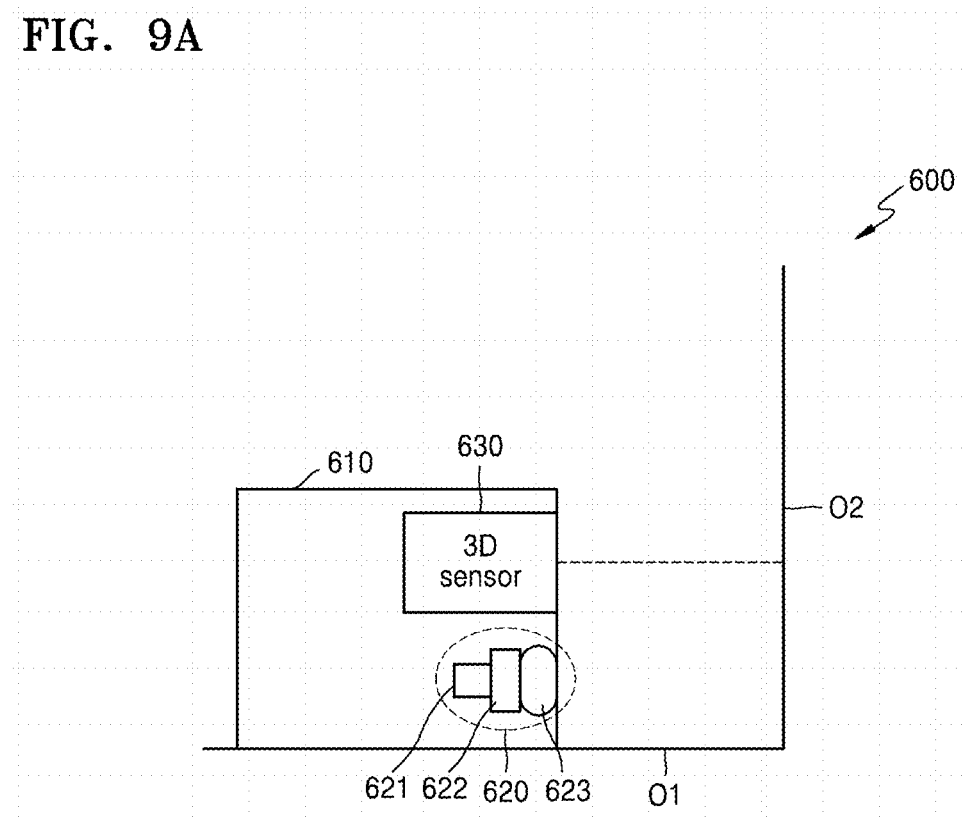
FIG. 9A is a schematic drawing of an autonomous robot according to an exemplary embodiment.

FIG. 9A is a schematic drawing of an autonomous robot 600 according to an exemplary embodiment. The autonomous robot 600 may include an optical unit 620, a 3D sensor 630, and a robot main body 610. The optical unit 620 may include a light source 621 that irradiates light onto objects, a diffuser 622 that is arranged on an optical path of light emitted from the light source 621 to diffuse light, and an optical element 623 that is arranged on an optical path of diffusing light diffused from the diffuser 622 to change an optical profile to be non-uniform. These elements were described above, and thus, the descriptions thereof will not be repeated. Also, the 3D sensor 630 was described above, and thus, the description thereof will be omitted.

The robot main body 610 is configured to mount a lidar apparatus that includes the optical unit 620 and the 3D sensor 630, and may control a driving direction of the lidar apparatus in response to location information sensed by the lidar apparatus.

In the autonomous robot 600 according to the exemplary embodiment, the 3D sensor 630 may be located on an upper side of the optical unit 620 based on a bottom surface of the autonomous robot 600.

Figure 9B:
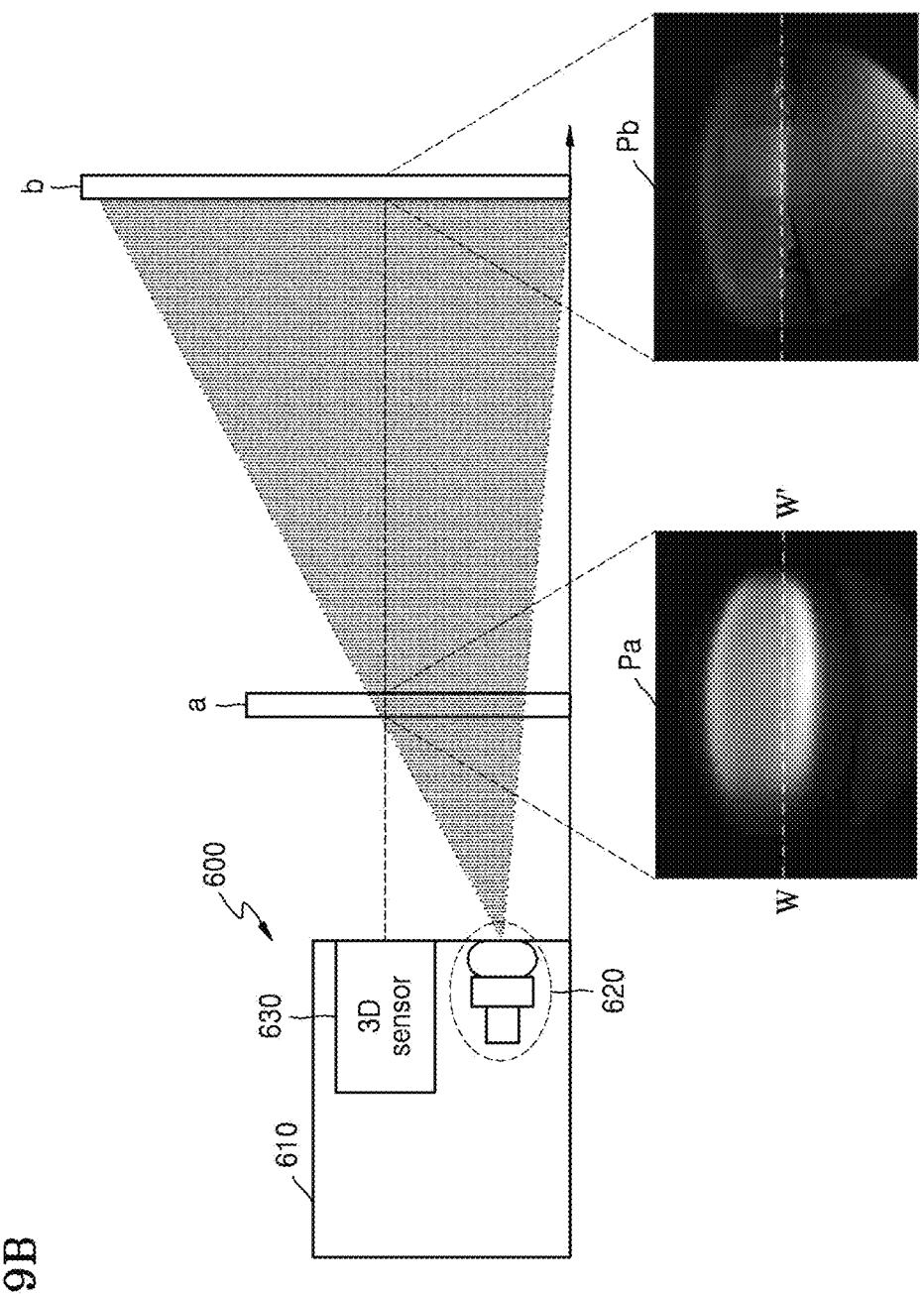
FIG. 9B shows photo-images taken by using the autonomous robot of FIG. 9A according to distances.

FIG. 9B shows photo-images taken by using the autonomous robot 600 of FIG. 9A according to distances. Referring to FIG. 9B, when light is irradiated from the optical unit 620, a photo-image Pa taken diffusing light reflected at an object a located near (a near object a) to the autonomous robot 600 and a photo-image Pb taken diffusing light reflected at an object b located remote (a remote object b) from the autonomous robot 600 may be compared. In taking these photos, the near object a is separated by a distance of 15 cm from the autonomous robot 600, and the remote object b is separated by a distance of 200 cm from the autonomous robot 600. For example, the optical unit 620 may be configured to mount the cylinder lens 322 (refer to FIG. 5A). When the photo-image Pa is viewed on an alternate long and short dash line W-W' extending from an optical axis of the 3D sensor 630, in the photo-image Pa taken at a distance of 15 cm, it is confirmed that the photo-image Pa includes a region of uniform optical profile with respect to the near object a, which will be described with reference to FIG. 11.

Figure 10A:
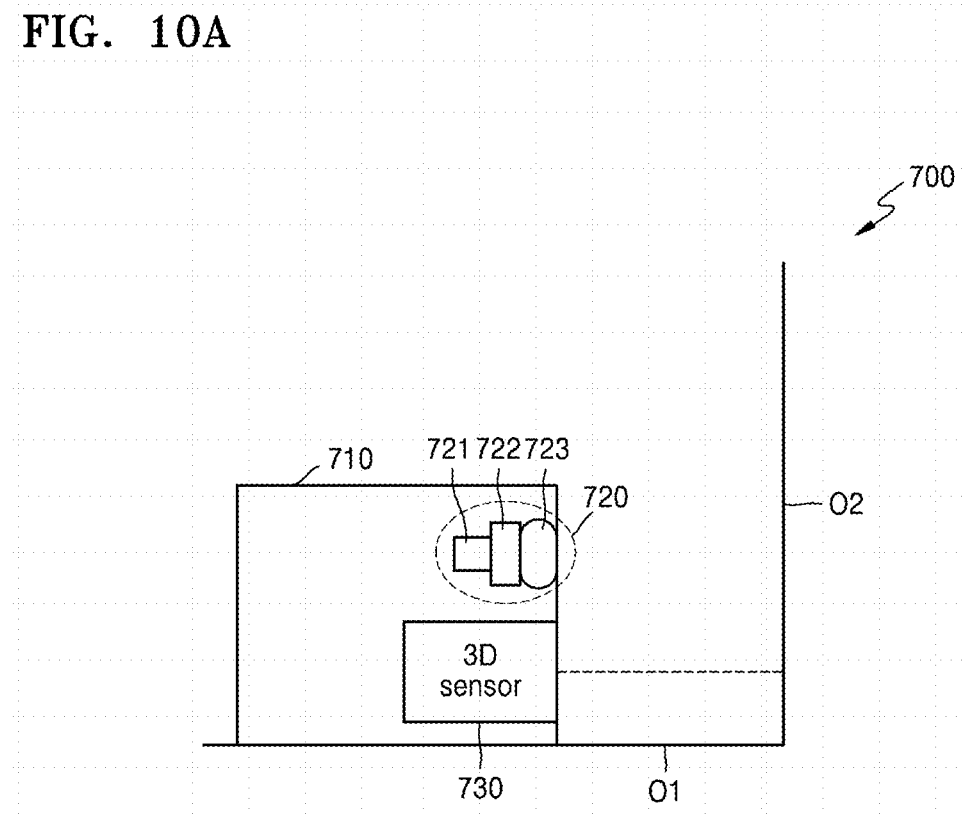
FIG. 10A is a schematic drawing of an autonomous robot according to another exemplary embodiment.

FIG. 10A is a schematic drawing of an autonomous robot 700 according to another exemplary embodiment. The autonomous robot 700 may include an optical unit 720, a 3D sensor 730, and a robot main body 710. The optical unit 720 may include a light source 721 that irradiates light onto objects, a diffuser 722 that is arranged on an optical path of light emitted from the light source 721 to diffuse light, and an optical element 723 that is arranged on an optical path of diffusing light diffused from the diffuser 722 to change an optical profile to be non-uniform. These elements were described above, and thus, the descriptions thereof will not be repeated. Also, the 3D sensor 730 was described above, and thus, the description thereof will be omitted.

The robot main body 710 is configured to mount a lidar apparatus that includes the optical unit 720 and the 3D sensor 730, and may control a driving direction of the lidar apparatus in response to location information sensed by the lidar apparatus.

In the autonomous robot 700 according to the exemplary embodiment, the 3D sensor 730 may be located on a lower side of the optical unit 720 based on a bottom surface of the autonomous robot 700.

Figure 10B:
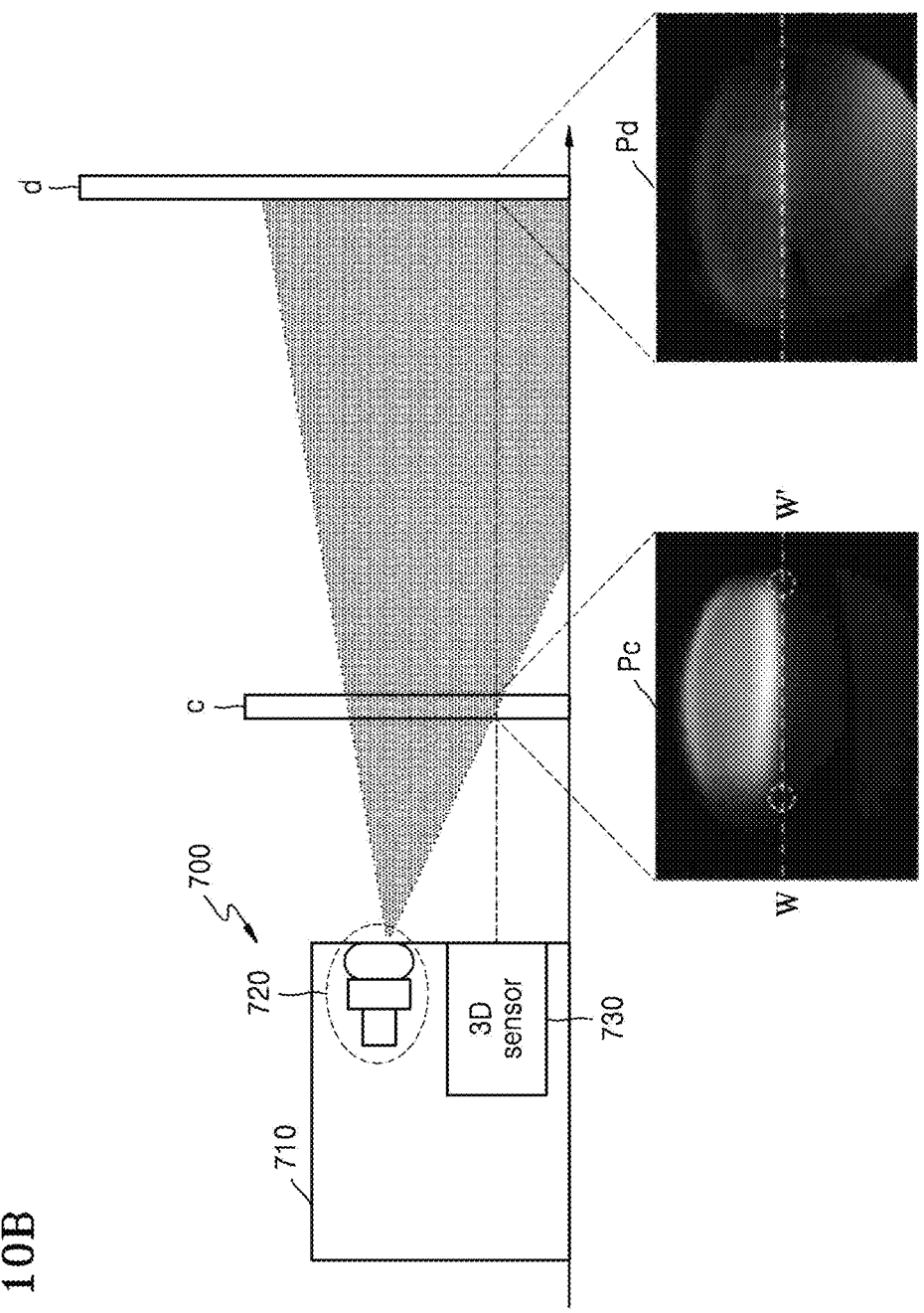
FIG. 10B shows photo-images taken by using the autonomous robot of FIG. 10A according to distances.

FIG. 10B shows photo-images taken by using the autonomous robot of FIG. 10A according to distances. Referring to FIG. 10B, when light is irradiated from the optical unit 720, a photo-image Pc taken diffusing light reflected at an object c located near (a near object c) to the autonomous robot 700 and a photo-image Pd taken diffusing light reflected at an object d located remote (a remote object d) from the autonomous robot 700 may be compared. In taking these photos, the near object c is separated by a distance of 15 cm from the autonomous robot 700, and the remote object d is separated by a distance of 200 cm from the autonomous robot 700. For example, the optical unit 720 may be configured to mount the cylinder lens 322 (refer to FIG. 5A). When the photo-image Pc is viewed on an alternate long and short dash line W-W' extending from an optical axis of the 3D sensor 730, in the photo-image Pc taken at a distance of 15 cm, it is seen that the optical profile with respect to the near object c is non-uniform, which will be described with reference to FIG. 11.

Figure 11:
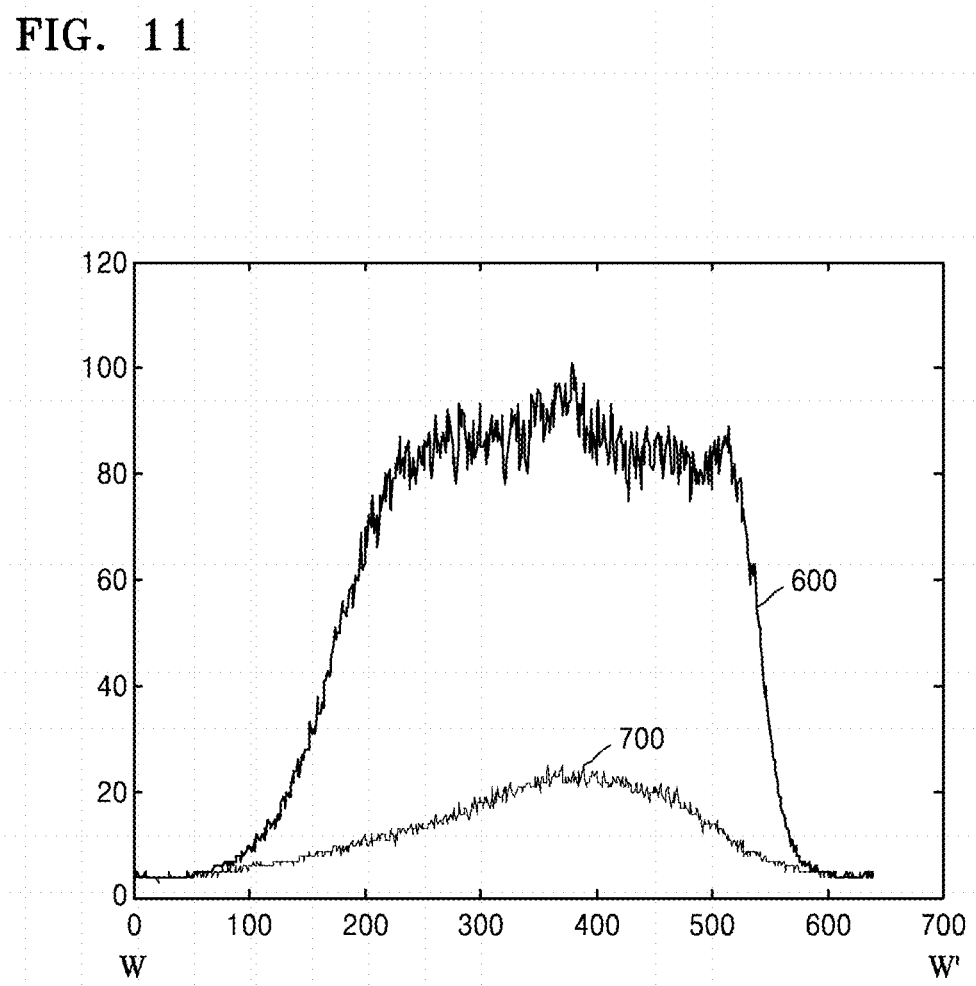
FIG. 11 is a graph showing comparison of optical profiles with respect to an object near to the autonomous robots of FIGS. 9A and 10A.

FIG. 11 is a graph showing comparison of optical profiles with respect to an object near to the autonomous robots 600 and 700 of FIGS. 9A and 10A. Referring to FIG. 11, the optical profiles based on the alternate long and short dash line W-W' (the W-W' line) of the photo-images Pa and Pc of the near objects a and c may be viewed. An x-axis of the graph indicates a relative location of a pixel on the W-W' line of the 3D sensors 630 and 730 and a y-axis indicates a relative intensity of reflection light received along the W-W' line of the 3D sensor 630 and 730.

Referring to FIG. 11, the optical profile of the photo-image Pa photographed by the autonomous robot 600 may be uniform in a pixel range from 200 to 600 along the x-axis. The pixel may denote resolution of a sensing unit of the 3D sensor 630. The optical profile of the photo-image Pc photographed by the autonomous robot 700 may have a non-uniform Gaussian distribution in a pixel range from 200 to 600 along the x-axis.

This result may denote that the photographing content of the autonomous robot may be changed according to the location relationship between the optical unit and the 3D sensor as well as the internal configuration of the optical unit.

Ordinary skill in the art may select the location relationship between the optical unit and the 3D sensor through simulations and tests. For example, in the autonomous robot described above according to the exemplary embodiment, the 3D sensor and the optical unit are arranged on an upper side or a lower side based on a bottom surface. However, the arrangement of the optical unit and the 3D sensor is not limited thereto, and the optical unit and the 3D sensor may be horizontally arranged. The autonomous robot may additionally include a variable constituent element that variably changes the locations of the optical unit and the 3D sensor according to photographing conditions.

The non-uniform light-emitting lidar apparatus according to the exemplary embodiment may increase photographing efficiency by irradiating non-uniform light. The non-uniform light-emitting lidar apparatus may change an optical profile of diffusing light to prevent the 3D sensor from over saturating by excessive reflection light from a near object. The non-uniform light-emitting lidar apparatus may further clearly distinguish a near object with a wide angle by changing an optical profile of diffusing light.

The autonomous robot according to the exemplary embodiment includes a non-uniform light-emitting lidar apparatus, and thus, may increase photographing efficiencies of both near photographing and distance photographing.

While one or more exemplary embodiments of non-uniform light-emitting lidar apparatuses and autonomous robots including the non-uniform light-emitting lidar apparatus have been described in detail with reference to accompanying drawings, it should be understood that exemplary embodiments described herein should be considered in a descriptive sense only and not for purposes of limitation. Also, it should be understood by those of ordinary skill in the art that various changes in form and details may be made therein without departing from the spirit and scope as defined by the appended claims.

What is claimed is:

1. A lidar apparatus comprising:
a light source configured to emit light;
an optical unit arranged on an optical path of light emitted from the light source and configured to change an optical profile of the light to be non-uniform; and
a 3D sensor configured to sense a location of an object by receiving reflection light from the object,
wherein the optical unit comprises:
 a diffuser configured to be arranged on the optical path of light emitted from the light source and to diffuse light to have a uniform intensity; and
 a lens or a grating device arranged on an optical path of diffusing light diffused from the diffuser and configured to change the optical profile of the diffusing light so that the diffusing light has a non-uniform intensity,
wherein the lens or the grating device changes the optical profile of the diffusing light to prevent the 3D sensor from over saturating by reflection light reflected by a first object located near the lens or the grating device, and
wherein the lens or grating device tilts a first portion of the diffusing light reaching the first object at a first distance from the lidar apparatus so that an intensity of the first portion of the diffusing light is lower than an intensity of a second portion of the diffusing light reaching a second object at a second distance greater than the first distance.

2. The lidar apparatus of claim 1, wherein the lens or the grating device tilts the first portion of the diffusing light so that the first portion of the diffusing light proceeds towards the second object.

3. The lidar apparatus of claim 1, wherein the lens comprises at least one of a cylinder lens, a micro lens array, and a Fresnel lens.

4. The lidar apparatus of claim 3, wherein the cylinder lens comprises a biconvex lens.

5. The lidar apparatus of claim 1, wherein the lens or the grating device is arranged to contact the diffuser.

6. The lidar apparatus of claim 1, wherein the light source is arranged on an upper side of the 3D sensor based on a ground surface.

7. The lidar apparatus of claim 1, wherein the light source is arranged on a lower side of the 3D sensor based on a ground surface.

8. The lidar apparatus of claim 1, wherein the light source and the 3D sensor are horizontally arranged based on a ground surface.

9. The lidar apparatus of claim 1, wherein the light source comprises a laser diode or a laser.

* * * * *